United States Patent

Kamata

[11] Patent Number: 5,964,118
[45] Date of Patent: Oct. 12, 1999

[54] METHOD OF MANUFACTURING A SIPE BLADE

[75] Inventor: Sachiko Kamata, Tokyo, Japan

[73] Assignee: Bridgestone Corporation, Tokyo, Japan

[21] Appl. No.: 09/199,417

[22] Filed: Nov. 25, 1998

Related U.S. Application Data

[62] Division of application No. 08/746,776, Nov. 15, 1996, abandoned.

[30] Foreign Application Priority Data

Nov. 17, 1995 [JP] Japan ..................................... 7-299759

[51] Int. Cl.$^6$ ..................................................... B21C 9/00
[52] U.S. Cl. ................................................ 72/286; 72/206
[58] Field of Search ............................... 72/286, 278, 274, 72/206

[56] References Cited

U.S. PATENT DOCUMENTS

| | | | |
|---|---|---|---|
| 2,333,238 | 11/1943 | Finnie | 72/206 |
| 2,736,924 | 3/1956 | Bean | 425/28.1 |
| 2,779,060 | 1/1957 | Knox | 425/28.1 |
| 3,199,567 | 8/1965 | Kunz | 425/46 |
| 3,432,888 | 3/1969 | Brierley | 425/28.1 |
| 3,553,790 | 1/1971 | Brobeck | 425/35 |
| 3,581,535 | 6/1971 | Hinks | 72/15.3 |
| 3,608,602 | 9/1971 | Youngblood | 425/28.1 |
| 3,645,123 | 2/1972 | Auge | 72/286 |
| 3,880,020 | 4/1975 | Clem | 72/324 |
| 4,154,564 | 5/1979 | French | 425/46 |

FOREIGN PATENT DOCUMENTS

| | | | |
|---|---|---|---|
| 152314 | 9/1982 | Japan | 72/274 |
| 2-200406 | 8/1990 | Japan . | |
| 4-215507 | 8/1992 | Japan . | |

OTHER PUBLICATIONS

Patent Abstracts of Japan, 08025365, Jan. 30, 1996.
Patent Abstracts of Japan, 08057857, Mar. 5, 1996.
*The Engineer,* "Shaped Wire Can Save Money", Jun. 14, 1968.
Patent Abstracts of Japan, 08025367, Jul. 15, 1994, "Tire Vulcanizing Mold and Production of Metal Blade Used Therein".

*Primary Examiner*—Daniel C. Crane
*Attorney, Agent, or Firm*—Sughrue, Mion, Zinn, Macpeak & Seas, PLLC

[57] ABSTRACT

Manufacturing of a sipe blade at a low cost and in a short time, and shortening of a manufacturing period and reduction in cost of a tire vulcanizing mold are achieved. A metal wire material is subjected to rolling and molding processing, and subsequently is subjected to heat treatment to form an intermediate material. The intermediate material is cut off and a hole is formed therein, and the sipe blade is thereby manufactured.

13 Claims, 5 Drawing Sheets

METHOD OF MANUFACTURING A SIPE BLADE

This is a divisional of application Ser. No. 08/746,776 filed Nov. 15, 1996, now abandoned the disclosure of which is incorporated herein by reference.

BACKGROUND OF THE INVENTION

1. Field of the Invention

The present invention relates to a tire vulcanizing mold in which a sipe blade for forming a sipe on a tire surface are provided on a surface of the mold, a sipe blade, and a method of manufacturing the sipe blade.

2. Description of the Related Art

Conventionally, in order to prevent slipping of a vehicle on an icy road, or the like, there has been known a technique for providing a plurality of sipes (i.e., shallow cuts) on a tire surface. Among these sipes, there is a sipe of a desired shape formed so as to prevent occurrence of a crack in a tire from a sipe bottom portion.

As a technique relating to formation of such a sipe, there have been disclosed a tire vulcanizing mold described in Japanese Patent Application Laid-Open (JP-A) No. 2-200406 and a sipe blade described in Japanese Patent Application Laid-Open (JP-A) No. 4-215507.

The technique disclosed in JP-A No. 2-200406 has a structure in which a free end of a sipe blade provided on a tire-molded surface of the vulcanizing mold is only folded back and a stepped portion is formed at a position of a folded end of the sipe blade. For this reason, when the mold is separated from the tire after vulcanization, rubber compositions are caught by the stepped portion due to the rubber compositions flowing in vicinities of the stepped portion during vulcanization of a tire. Thus, smooth separation of the mold from the tire has not been achieved. Further, when a desired mold is formed in the sipe blade, for example, when a mold is formed in a direction perpendicular to a direction of the sipe blade being folded back, a cross-sectional configuration of the sipe-blade folded portion locally deforms due to insufficient strength of the folded portion. As a result, the sipe may not be formed in a desired shape.

Further, the technique disclosed in JP-A No. 4-215507 has a structure in which an axial pin is inserted in an inner side of the folded portion of the sipe blade, and has a drawback in that a manufacturing cost of the sipe blade rises due to an increase in the number of parts. Further, with this structure, the sipe blade is bent with the axial pin being used as a core member of the bent portion thereof, so that the shape of the bent portion conforms to that of the axial pin. Accordingly, in order to accurately manufacture all of the sipe blades used for the entire mold, all the axial pins must be accurately machine-processed. Even in this case, the manufacturing cost rises.

SUMMARY OF THE INVENTION

In view of the above-described circumstances, it is an object of the present invention to manufacture, at a low cost, a tire vulcanizing mold for forming sipes of a desired shape having a uniform cross-sectional size and shape accuracy, to achieve shortening of a manufacturing period, and to manufacture, at a low cost and in a short period of time, a sipe blade including a bent portion with sufficient strength and having necessary yield strength which does not cause the bent portion to deform locally when a mold is formed in the sipe blade.

In accordance with a first aspect of the present invention is a tire vulcanizing mold in which a sipe blade for forming a sipe on a surface of a tire is fixed onto a surface of the mold, wherein the sipe blade is formed in such a manner that a metal wire material is rolled and molded to form an intermediate material whose cross section in a transverse direction thereof is of a desired shape, and the intermediate material is cut off in a desired manner and a desired hole is formed therein.

In accordance with a second aspect of the present invention is a sipe blade which is fixed onto a surface of a tire vulcanizing mold to form a sipe on a tire surface, the sipe blade being formed in such a manner that a metal wire material is rolled and molded to form an intermediate material whose cross section in a transverse direction thereof is of a desired shape, and the intermediate material is cut off in a desired manner and a desired hole is formed therein.

In accordance with a third aspect of the present invention is a method of manufacturing a sipe blade used in a tire vulcanizing mold in which a sipe blade for forming a sipe on a surface of a tire is fixed onto a surface of the mold, comprising the steps of: manufacturing an intermediate material whose cross section in a transverse direction thereof is of a desired shape in such a manner that a metal wire material serving as a base material is rolled and molded while passing through a die and thereafter the metal wire material is subjected to heat treatment; and applying desired cutting, hole-forming, or necessary molding to the intermediate material.

According to the present invention, the intermediate material which is used as a standard material of the sipe blade is previously manufactured and prepared, so that sipe blades of various dimensions having a uniform cross sectional dimension and a uniform shape can be easily obtained. Further, the cross section of the intermediate material in a transverse direction thereof is formed in a desired integral shape by being rolled and molded repeatedly. For this reason, even if the sipe blade is molded, yield strength which does not cause a bent portion of the intermediate material to deform can be maintained.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENT

Figure 1:
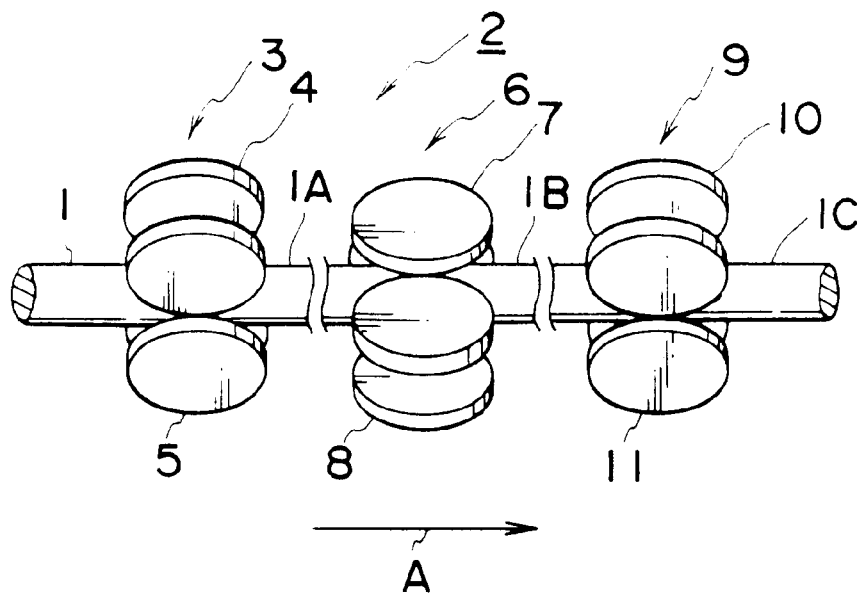
FIG. 1 shows one of processes for manufacturing a sipe blade, in which an intermediate material is obtained by passing a metal-wire base material through a roller die.
Figure 2:
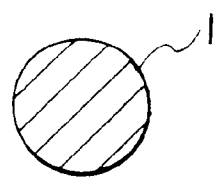
FIG. 2 is a cross-sectional view of the metallic-wire material.
Figure 3:
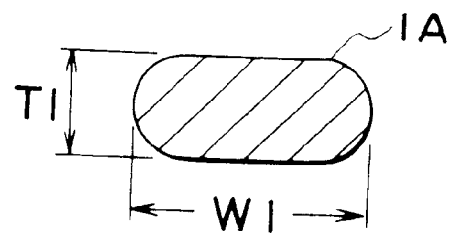
FIG. 3 is a cross-sectional view of the intermediate material.
Figure 4:
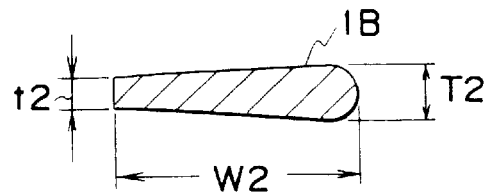
FIG. 4 is a cross-sectional view of the intermediate material.

An embodiment of the present invention will be described hereinafter with reference to FIGS. 1 through 12 and according to manufacturing procedures which will be described below.

A. Manufacturing Process of an Intermediate Material (1) Rolling and heat treatment by a roller die (see FIGS. 1 through 5)

First, as an example, a metal-wire base material 1 having a circular cross-sectional configuration, of which diameter is ranged from about 8 mm to about 10 mm (in FIG. 2, the diameter is about 8 mm), is caused to pass through a path of a first roller 3 from an upstream side of a roller die device 2. The metal-wire base material 1 is rolled by an upper roller 4 and a lower roller 5 while passing through the path of the first roller 3. As a result, the metal-wire base material 1 is changed from a circular cross-sectional configuration shown in FIG. 2 to an intermediate material 1A shown in FIG. 3 of which upper and lower sides are made flat and remaining sides between the upper and lower sides are made round to have a substantially oblong cross-sectional configuration (the thickness T1 of the intermediate material 1A is 3 mm and the width W1 thereof is 10 mm).

After the intermediate material 1A which has passed through the first roller 3 is subjected to heat treatment (annealing), the intermediate material 1A is caused to pass through a path of a second roller 6. The intermediate material 1A is further rolled by horizontal rollers 7, 8 while passing through the path of the second roller 6. As a result, the intermediate material 1A is changed from the cross section shown in FIG. 3 to an intermediate material 1B shown in FIG. 4, of which upper and lower sides are further made flat and thicknesses of left and right ends have different dimensions (T2=2.3 mm, t2=1.2 mm, W2=12 mm).

After the intermediate material 1B which has passed through the second roller 6 has been subjected to heat treatment, the intermediate material 1B is caused to pass through a path of a third roller 9. The intermediate material 1B is further rolled by an upper roller 10 and a lower roller 11 while passing through the third roller 9. As a result, the intermediate material 1B is changed from the cross section shown in FIG. 4 to an intermediate material 1C shown in FIG. 5, having a cross section close to a final shape (T3=1.8 mm, t3=0.8 mm, W3=14 mm).

Figure 5:
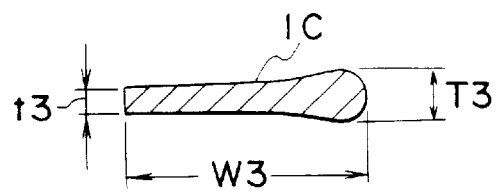
FIG. 5 is a cross-sectional view of the intermediate material.

The above process is practically effected in such a manner as described below. Namely, the metal-wire base material 1 is pulled out from an upstream side of the first roller 3 to a downstream side of the third roller 9 (i.e., in the direction indicated by arrow A in FIG. 1) at a time, so that a rolling operation in which the cross section of the base material 1 is changed from that of FIG. 2 to that of FIG. 5 is completed.

Figure 6:
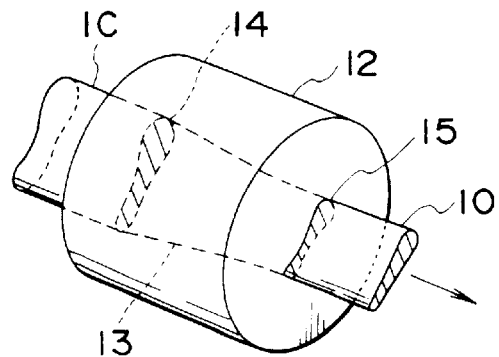
FIG. 6 shows a process in which a final shape of the intermediate material is obtained by passing the intermediate material through a taper hole die.
Figure 7:
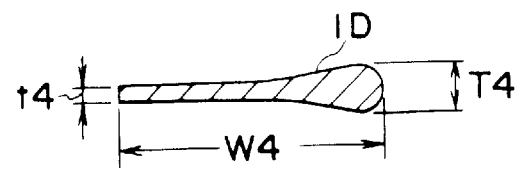
FIG. 7 is a cross-sectional view showing the final shape of the intermediate material.

(2) Finish of rolling processing (see FIGS. 6 and 7)

After the intermediate material 1C which has passed through the third roller 9 has been subjected to heat treatment, the intermediate material 1C is caused to pass through a path 13 of a taper hole die 12. An inner portion of the path 13 is formed in a tapered manner in which an area of an outlet 15 is made smaller than that of an inlet 14 and a cross-sectional area of the path 13 gradually becomes smaller toward the downstream side, i.e., the side of the outlet 15. The intermediate material 1C is pulled out from the inlet 14 of the taper hole die 12 to the outlet 15, and an intermediate material 1D, of which cross section is approximately close to the final shape shown in FIG. 7 (T4=1.6 mm, t4=0.7 mm, W4=15 mm), is thereby obtained.

B. Manufacturing Process of a Sipe Blade (see FIGS. 8 through 11)

(3) The intermediate material 1D is used as a standard material of the sipe blade. Many sipe blades of different shapes can be manufactured from the same intermediate material 1D.

Figure 8:
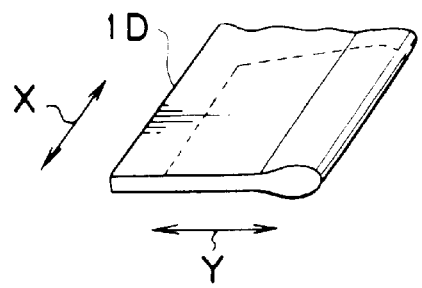
FIG. 8 is a perspective view showing a process in which a sipe blade is formed from the intermediate material.
Figure 9:
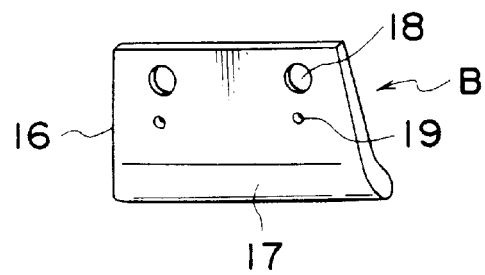
FIG. 9 is a perspective view showing a process in which holes are formed in the sipe blade.

As an example, as shown in FIG. 8, the intermediate material 1D is cut off in the longitudinal direction (i.e., the direction of arrow X) and in the transverse direction (i.e., the direction of arrow Y) along the dotted line in FIG. 8. In a sipe blade B thus obtained, which is formed from a flat portion 16 and a bent portion 17, a fixed hole 18 for preventing pull-out of the blade and an air hole 19 are formed in the flat portion 16 in a direction of thickness of the plate as shown in FIG. 9.

Figure 10:
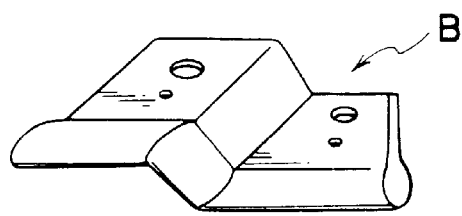
FIG. 10 is a perspective view showing a process in which the sipe blade is molded by being bent.
Figure 11:
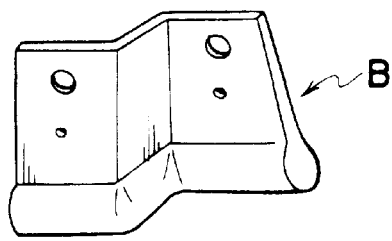
FIG. 11 is a perspective view showing a finished product of the sipe blade.
Figure 12:
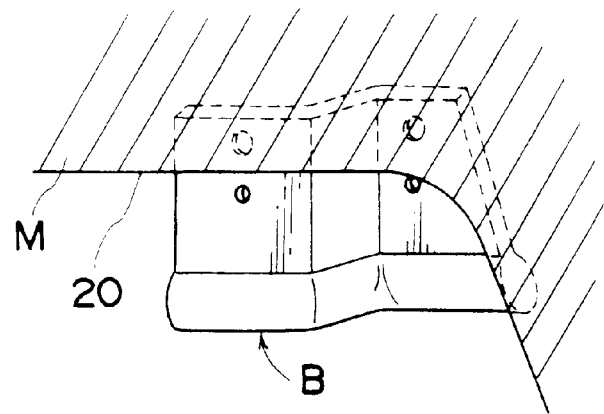
FIG. 12 shows a state in which the sipe blade is provided in a tire vulcanizing mold.
Figure 13:
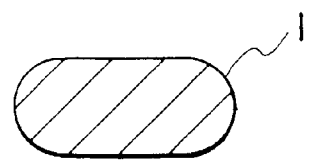
FIG. 13 is a cross-sectional view showing another shape of the metal-wire material.
Figure 14:
FIG. 14 is a cross-sectional view showing still another shape of the metal-wire material.
Figure 15:
FIG. 15 is a cross-sectional view showing still another shape of the metal-wire material.
Figure 16:
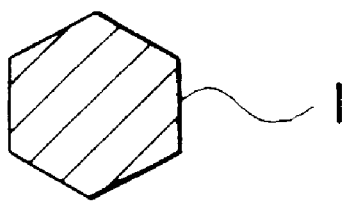
FIG. 16 is a cross-sectional view showing still another shape of the metal-wire material.

(4) After, as shown in FIG. 10, the sipe blade B is molded by being bent when necessary, finishing is applied to the sipe blade B and a completed blade as shown in FIG. 11 is obtained. The completed blade is, as shown in FIG. 12, fixed onto a mold surface 20 of the tire vulcanizing mold M.

FIGS. 13 through 16 show another examples of the metallic-wire base material applied to the present invention. Namely, in addition to the circular cross section shown in FIG. 2, the metallic-wire base material may have a flat-circle cross section shown in FIG. 13 in which upper and lower surfaces are made flat and side portions therebetween are made round, a triangular cross section shown in FIG. 14, a square cross section shown in FIG. 15, and a polygonal cross section such as a hexagonal cross section shown in FIG. 16, or the like.

Figure 17:
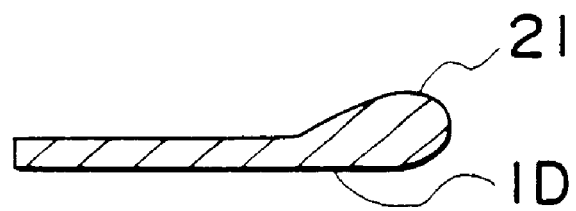
FIG. 17 is a cross-sectional view showing another shape of the intermediate material.
Figure 18:
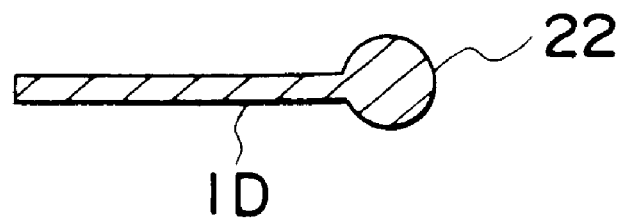
FIG. 18 is a cross-sectional view showing still another shape of the intermediate material.

Further, the cross section of the intermediate material 1D is not limited to a flask-shaped configuration shown in FIG. 7. For example, a bent portion 21 may be formed on one side of the intermediate material 1D as shown in FIG. 17, a bent portion 22 having a circular cross section may be formed in the intermediate material 1D as shown in FIG. 18, or the like.

The present invention has the following effects:

(1) The intermediate material which is used as a standard material of the sipe blade can be previously manufactured and prepared by rolling and forming the metal wire material. Further, rolling and drawing from the metal wire material to the standard material of the sipe blade can be effected by using a simple equipment.

(2) By cutting the intermediate material when necessary, or the like, a desired sipe blade having a uniform cross-sectional size and shape accuracy can be easily manufactured.

(3) It is possible to manufacture, at a low cost and in a short period of time, a sipe blade for forming a desired shape of a sipe.

(4) It is possible to achieve shortening of a manufacturing period of time and reduction in cost of a tire vulcanizing mold by which sipes of a desired shape having a uniform cross sectional size and shape accuracy are formed on a surface of a tire.

(5) By providing sufficient strength for a bent portion of the intermediate material, it is possible to manufacture a sipe blade having necessary yield strength which does not cause the bent portion to deform locally when molded.

While the embodiment of the present invention, as herein disclosed, constitutes a preferred form, it is to be understood that other forms might be adopted.

What is claimed is:

1. A method of manufacturing a sipe blade, comprising:
   manufacturing an intermediate material whose cross section in a transverse direction thereof is of a desired shape, said manufacturing comprising:
      rolling a metal wire material serving as a base material;
      heat treating the rolled metal wire; and
      passing the rolled and heat treated metal wire material through a die; and
   at least one of desired cutting, hole-forming, or bending of the intermediate material to form the sipe blade.

2. A method of manufacturing a sipe blade according to claim 1, wherein said rolling and heat treating are effected a plurality of times.

3. A method of manufacturing a sipe blade used in a tire vulcanizing mold in which a sipe blade for forming a sipe on a surface of a tire is fixed onto a surface of the mold, comprising:
   manufacturing an intermediate material whose cross section in a transverse direction thereof is of a desired shape, said manufacturing, comprising:
      rolling a metal wire material serving as a base material;
      heat treating the rolled metal wire; and
      passing the rolled and heat treated metal wire material through a die; and
   at least one of desired cutting, hole-forming, or bending of the intermediate material to form the sipe blade used in the tire-vulcanizing mold.

4. A method of manufacturing a sipe blade according to claim 3, wherein said rolling and heat treating are effected a plurality of times.

5. A method of manufacturing a sipe blade according to claim 3, wherein the intermediate material has a flask-shaped cross sectional configuration.

6. A method of manufacturing a sipe blade according to claim 3, wherein the intermediate material has a bent portion formed in only one side of a cross section of the intermediate material.

7. A method of manufacturing a sipe blade according to claim 3, wherein the intermediate material has a bent portion having a circular cross sectional configuration.

8. A method of manufacturing a sipe blade according to claim 3, wherein the metal wire material has a circular cross sectional configuration.

9. A method of manufacturing a sipe blade according to claim 3, wherein the metal wire material has a flat-circular cross sectional configuration in which upper and lower surfaces are made flat and side surfaces between the upper and lower surfaces are made round.

10. A method of manufacturing a sipe blade according to claim 3, wherein the metal wire material has a triangular, square or polygonal cross sectional configuration.

11. A method of manufacturing a sipe blade which is used in a tire vulcanizing mold for forming a sipe in a tire tread, comprising:
    forming an intermediate member by:
       passing a metal wire through at least one pair of opposing rollers;
       heat treating the metal wire after the wire is passed through said at least one pair of opposing rollers; and
       passing the metal wire that has been heat treated through a die to form the intermediate member; and
    bending, cutting and/or forming a hole in the intermediate member to form the sipe blade which is to be used in the tire vulcanizing mold for forming the sipe in the tire tread.

12. The method recited in claim 11, wherein the at least one pair of opposing rollers is a plurality of pairs of opposing rollers, and said heat treating is performed on the metal wire after the metal wire passes through each of said plurality of pairs of opposing rollers.

13. The method recited in claim 11, wherein said passing of the metal wire material through the at least one pair of opposing rollers, said heat treating and said passing of the metal wire through the die are performed simultaneously on the same metal wire.

* * * * *